United States Patent [19]

Rzeszewski et al.

[11] 4,238,769
[45] Dec. 9, 1980

[54] VERTICAL SYNCHRONIZATION CIRCUIT FOR TELEVISION RECEIVERS

[75] Inventors: Theodore S. Rzeszewski, Lombard; Peter H. Van Anrooy, Itasca, both of Ill.

[73] Assignee: Matsushita Electric Corp. of America, Franklin Park, Ill.

[21] Appl. No.: 48,055

[22] Filed: Jun. 13, 1979

[51] Int. Cl.³ .............................................. H04N 5/10
[52] U.S. Cl. ................................................... 358/154
[58] Field of Search ................ 358/148, 153, 154, 158

[56] References Cited

U.S. PATENT DOCUMENTS

| | | | |
|---|---|---|---|
| 2,543,015 | 2/1951 | Grieg | 358/154 |
| 2,763,718 | 9/1956 | Collins | 358/154 |
| 3,074,027 | 1/1963 | Rout | 358/158 |
| 3,487,167 | 12/1969 | Riggin | 358/154 |
| 3,532,810 | 10/1970 | Steinberg | 358/154 |
| 3,619,497 | 11/1971 | Ellis | 358/154 |
| 3,751,588 | 8/1973 | Eckenbrecht | 358/158 |
| 3,809,809 | 5/1974 | Vidovic | 358/154 |
| 4,001,715 | 1/1977 | Fukaya | 358/158 |

Primary Examiner—Robert L. Griffin
Assistant Examiner—Michael Allen Masinick
Attorney, Agent, or Firm—Lavalle D. Ptak

[57] ABSTRACT

An improved vertical synchronization system for a television receiver provides both good noise immunity and improved interlace. This is achieved by employing two parallel vertical synchronization circuits between the synchronizing signal input of the vertical oscillator and synchronizing signal source. One of these vertical synchronizing circuit paths comprises a standard integrator circuit adjusted for optimum noise immunity and the other is a cascaded digital circuit adjusted for improved interlace but having poorer noise immunity than the first circuit. The digital circuit produces a synchronizing pulse slightly ahead of the pulse produced by the conventional circuit so that the digital circuit normally controls the operation of the oscillator. Whenever extreme noise conditions exist, the digital circuit is disabled and the conventional synchronizing signal circuit takes over the synchronizing task.

6 Claims, 4 Drawing Figures

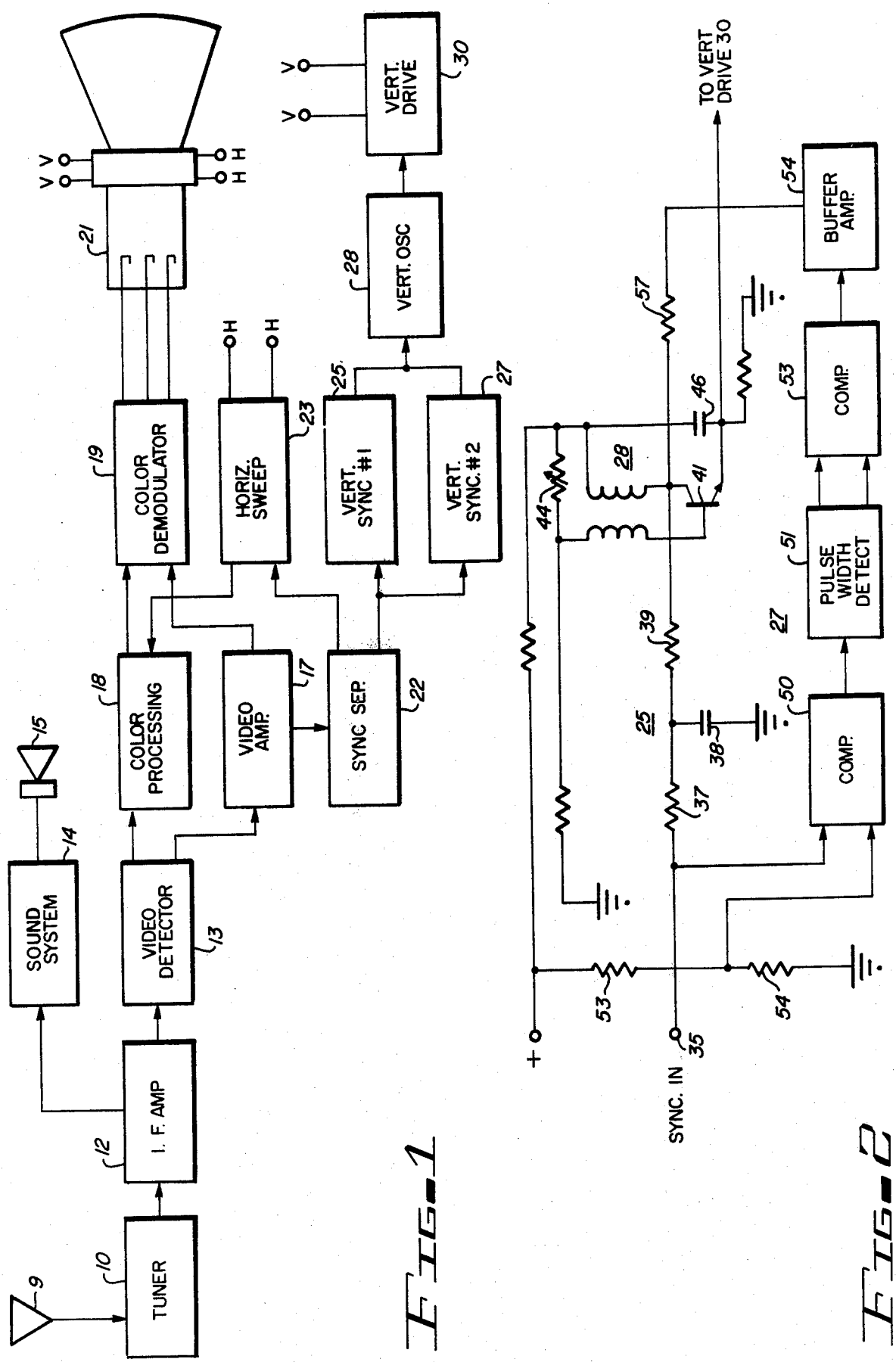

VERTICAL SYNCHRONIZATION CIRCUIT FOR TELEVISION RECEIVERS

BACKGROUND OF THE INVENTION

Television receivers, both monochrome and color, respond to a composite signal which includes horizontal and vertical synchronizing signal pulses used by the television receiver to synchronize the beam deflection of the picture tube with the transmitted signal for producing accurate images. This is accomplished, in part, by producing accurately timed reference pulses in response to the received horizontal and vertical synchronizing signal components of the received signal. The horizontal synchronizing signal comprises a series of pulses at the line frequency, and the leading edge of each of these pulses occurs at the start of each line to be traced horizontally across the width of the picture tube. In the standard NTSC signal used in the United States, these horizontal pulses are approximately five microseconds wide with a 63.5 microsecond interval between each of the horizontal pulses. As is well known in the United States, 525 lines comprise the number of lines in the picture. In other countries of the world similar signals are used but in some countries 625 lines comprise the picture instead of the 525 lines used in the United States. In all other respects the composition of the transmitted television signals are substantially the same.

The vertical synchronizing signals which occur at the commencement of each picture field comprise a group of six pulses, each broad in comparison with the horizontal line synchronizing pulses and occuring at a repetition rate which is equal to two times the line frequency. As a consequence, a complete vertical synchronizing signal occupies a time period equivalent to three lines. The signal is repeated for each field with the leading edge of the first of the six pulses occuring at the commencement of the field. Typically the width of the vertical synchronization pulses is almost equal to one-half a horizontal line duration so that these pulses are on the order of 27.3 microseconds wide.

The vertical synchronizing signal is preceded by a group of six narrow pulses called equalizing pulses which also occur at a repetition rate of twice the line frequency. A second group of six narrow equalizing pulses follows the vertical synchronizing signal. The pulse width of the equalizing pulses typically is 2.5 microseconds.

The horizontal and vertical synchronizing signals, along with the equalizing pulses, comprise a combined synchronizing signal. In the NTSC system, interlaced scanning is employed. This means that each complete picture comprises two fields which are referred to as the even and odd fields. The even-even fields commence at the beginning of the first line and contain half the total number of lines ending at the mid point of a line since the total number of lines is odd. The odd fields commence at the midpoint of the line on which the even fields end and contain the remaining lines, ending at the end of the last line of the picture.

The nature of the vertical synchronizing and the equalizing signals is such that they contain leading edges of pulses at times which correspond to the start of each line which occur when these signals of the composite synchronizing signal are present. As a result, horizontal synchronizing signals for each line readily are derived from the combined synchronizing signal even during those portions where the equalizing pulses and vertical synchronizing pulses are present.

The conventional method of vertical synchronization in most television receivers is to pass this composite synchronization signal through an integrater circuit and to use the signal output of the integrater circuit to trigger or synchronize the operation of a blocking oscillator. As long as the vertical sweep of the television picture tube is started in exactly the same point of the vertical synchronization pulse interval of the alternating odd and even fields, and as long as the sweep has equally good linearity for both fields, there is no interlace problem in the received picture. This however, is difficult to obtain with such a standard integrating circuit type of vertical synchronization. In general the slope of the integrated pulse produced by such circuits is selected to be shallow enough to provide immunity against false starts by horizontal pulses, noise "spikes" and the like. This provides good noise immunity but a shallow slope can result in and does result in timing errors caused by the residual firing level voltage ripples (resulting from insufficient power supply isolation or filtering). As a consequence the reproduced picture has "pairing" of horizontal lines of sequential picture fields instead of the desired 50%–50% interlace.

In the past, using integrater type vertical synchronization circuits, efforts to eliminate the undesired lack of interlace necessarily involved an undesired trade off with the good noise immunity since improved interlace only could be obtained from an integrater circuit by increasing the slope of the integrated pulse. This is accomplished by increasing the band width of the low pass filter of the integrater circuit which results in a directly proportional degradation of the noise immunity of the vertical synchronization circuit.

To overcome the disadvantages of integrater type synchronization circuits, systems have been proprosed which rely on counting the number of horizontal synchronization pulses and dividing these pulses by a fixed ratio to achieve the improved interlace or stability. Systems of this type, however, are not compatible with non standard broadcast signals or many consumer type video tape recorders (VTR) or video game systems. In addition, the acquisition time of such systems of the prior art using a "count down" technique is slower than the acquisition time of conventional integrater circuit type vertical synchronization systems.

Other approaches have been proposed which rely upon stable phase locked vertical oscillators. Such oscillators have desirable stability and obviously inherently possess good interlace capabilities but systems of this type have slow acquisition times as a result of the narrow and stable acquisition range. Consequently, such phase locked looped systems often are not compatible with non standard signal formats with which television receivers increasingly must be compatible.

U.S. Pat. No. 3,619,497 issued to Richard Ellis on Nov. 9, 1971 discloses a digital synchronization signal separater including a pair of cascaded multivibrators and coincidence gates for obtaining vertical synchronization pulses with fairly constant and accurately known timing with respect the field datum point. While the system disclosed in this patent provides the desired 50/50 interlace, it suffers from inherently poorer noise immunity than the conventional integrated circuit type of vertical synchronization signal separater circuit. Consequently the circuit tends to become disabled under noisy signal conditions which would not disable a conventional integrating circuit type of synchronizing signal separater.

Accordingly, it is desirable to provide a vertical synchronizing signal separater circuit which has optimum interlace and optimum noise immunity. This is particularly important for large screen television receivers such as projection television receivers, since poor interlace is much more apparent to a viewer watching such a receiver than when a small screen television receiver is being watched. Ideally it is desirable to provide a synchronizing signal separater circuit having good interlace and good noise immunity to such an extent that the conventional vertical "hold" control could be eliminated from the receiver.

SUMMARY OF THE INVENTION

It is an object of this invention to improve the acquisition time of the vertical synchronization of a television receiver.

It is an another object of this invention to provide vertical synchronization of a television receiver with accurate interlace.

It is an additional object of this invention to provide improved interlace with no degradation in noise immunity of the vertical synchronization of a television receiver.

It is a further object of this invention to provide vertical synchronization of the television receiver which is compatible with standard and non standard vertical synchronization signals.

It is still another object of this invention to provide an improved vertical synchronization circuit for a television receiver which may be implemented in integrated circuit form.

It is yet another object of this invention to provide a vertical synchronization circuit for a television receiver which has optimum interlace and optimum noise immunity.

In accordance with a preferred embodiment of this invention an improvement in the vertical synchronization circuitry of a television receiver is achieved in a circuit which includes a portion for receiving a composite television signal including synchronization signal components. This circuit portion provides at least the vertical synchronization signal components on an output to a pair of first and second vertical synchronization circuits. These circuits are connected in parallel with one another between the output of the signal receiving circuit portion and the synchronizing signal input terminal of a vertical oscillator. The vertical oscillator supplies the vertical drive signals on its output for use by the television receiver. A first one of the vertical synchronizing circuits is adjusted for maximum noise immunity and supplies vertical synchronizing pulses to the oscillator a predetermined time after receipt of the vertical synchronizing signal components by the signal receiving portion. The second vertical synchronizing circuit is adjusted for correct interlace and produces a synchronizing pulse a second predetermined time after the receipt of the vertical synchronizing signal components. The synchronizing signal pulses produced by the second vertical synchronizing circuit occur prior to the pulses produced by the first synchronizing circuit and thereby override or take precedence over those from the first circuit, so long as pulses are obtained from the output of the second synchronizing circuit. Under noisy signal conditions, the second synchronizing circuit may not produce output pulses; and under such conditions of operation, synchronization of the oscillator then is taken over by the first vertical synchronizing circuit which has better noise immunity than the second synchronizing circuit.

BRIEF DESCRIPTION OF THE DRAWINGS

FIG. 1 is a block diagram of a television receiver incorporating a preferred embodiment of the invention;

FIG. 2 is a detailed circuit diagram of a portion of the circuit shown in FIG. 1;

DETAILED DESCRIPTION

Figure 3:
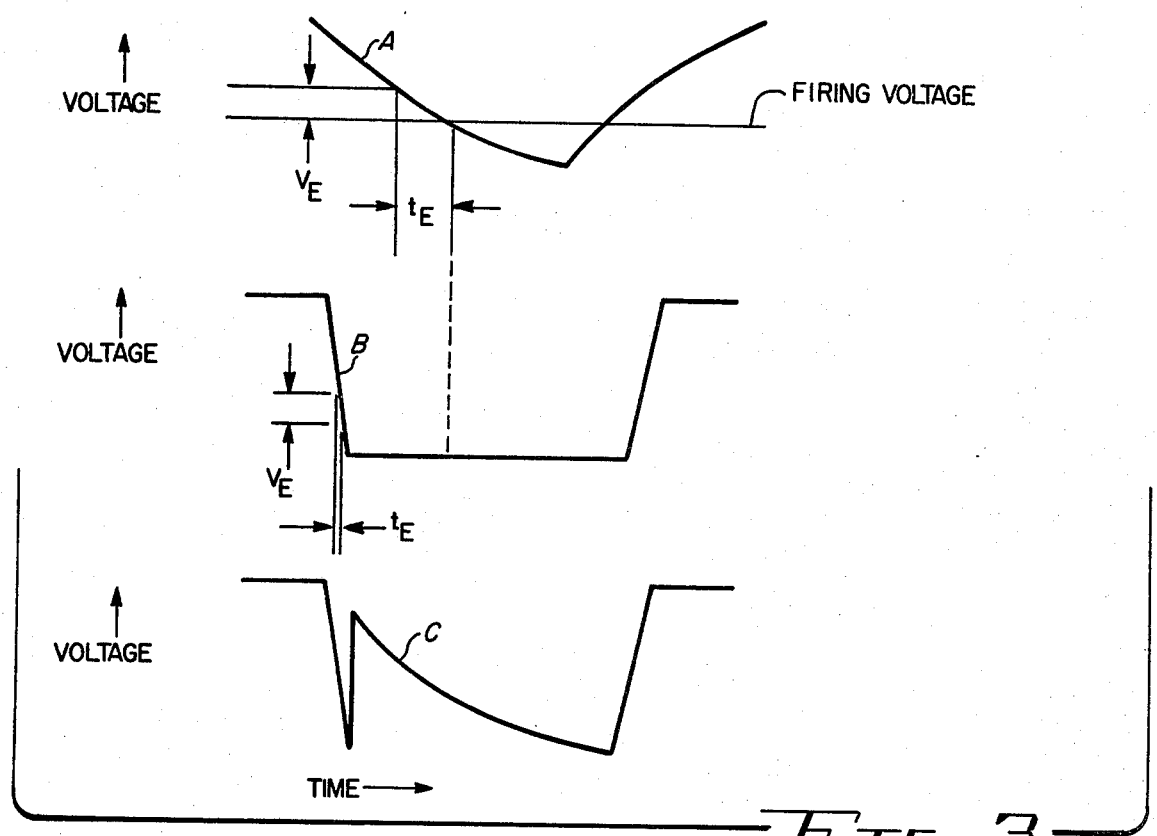
FIG. 3 shows wave forms useful in describing the operation of the circuit shown in FIGS. 1 and 2.

Reference now should be made to the drawings where the same reference numbers are used in the various figures to designate the same or similar components.

In FIG. 1, there is shown a color television receiver including an antenna 9 supplying input signals to a tuner 10 which receives and converts the incoming television signals to an intermediate frequency signal. The tuner 10 may include for example, RF stages of the receiver as well as the first detector or mixer and associated local osillators. The output intermediate frequency signal developed by the tuner 10 is coupled through an intermediate frequency amplifier stage 12 to a video detector 13. The output of the intermediate frequency amplifier 12 also is supplied to a sound system 14, which supplies the amplified audio signals to a loudspeaker 15. The signal components in the detected composite video signal are appled to a video amplifier processing circuit 17 and to a color processing circuit 18. The outputs of both of these circuits are supplied to a color demodulator circuit 19, which in turn supplies the desired demodulated color drive signals to the three cathodes of the cathode ray picture tube 21 for the television receiver. All of these components, which have been described, are conventional; so that no detailed description of these components is considered necessary here.

The composite signals provided by the video amplifier 17 also are supplied to a synchronizing pulse separater circuit 22, the outputs of which are supplied to the horizontal sweep circuit 23 and to two vertical synchronization circuits 25 and 27, connected in parallel with one another. A separate synchronizing circuit 22 is illustrated in the drawing, but it is understood that the vertical synchronizing signal components of the composite signal are separated from the composite signal by the circuits 25 and 27 in a manner to be described in greater detail subsequently. The circuit 22 is used for the purpose of supplying the horizontal synchronizing signals to the horizontal sweep circuit 23. The output of the horizontal sweep circuit 23 is applied to the horizontal deflection windings of the cathode ray tube 21.

As stated previously, the system operates on a standard NTSC telvevision signal which comprises video information components with blanking intervals recurring at the horizontal rate of 15,734 Hz. A horizontal synchronizing pulse appears at the beginning of each blanking interval, immediately followed by color burst signal components. These are standard components of the television signal. Vertical synchronizing pulses also appear in the composite video signal preceded and followed by the equalizing pulse intervals, described above, which separate the vertical synchronizing pulses from the horizontal synchronizing pulses in the standard signal.

The outputs of both of the vertical synchronizing circuits 25 and 27 are connected in common to the synchronizing signal input of a blocking vertical oscillator 28 to control the synchronization of operation of the oscillator 28. Such synchronization is conventional, and the oscillator 28 supplies signals to a vertical drive circuit 30, the outputs of which in turn develop the vertical saw tooth sweep signal applied to the vertical deflection windings V—V on the neck of the cathode ray tube 21 for vertically deflectiing the electron beams therein.

Under normal conditions of operation, the vertical synchronizing circuit 27 produces a synchronizing output pulse slightly in advance of the time an output pulse is obtained from the vertical synchronizing circuit 25. The synchronizing circuit 27 is a digital vertical synchronization circuit adjusted for optimum interlace. As a consequence, so long as the vertical oscillator 28 is controlled by the output of this synchronizing circuit, the desired 50%-50% interlace of the odd and even vertical fields is effected by the system.

The synchronizing circuit 27 however does not have noise immunity which is as good as the noise immunity of the synchronizing circuit 25, which is a conventional integrator type RC circuit adjusted to have optimum noise immunity. Consequently, whenever noise occurs in the signal which exceeds the noise immunity of the synchronizing circuit 27, that circuit is disabled; and the conventional vertical synchronizing circuit 25 takes over to control the synchronization of the oscillator 28. Although the interlace capabilities of the circuit 25 are not as good as those of the circuit 27, the operation of the television receiver under the control of the vertical synchronization circuit 25 is at least as good as that of a conventional receiver.

Reference now should be made to FIG. 2 which shows the parallel vertical synchronization circuits 25 and 27 in greater detail. The composite synchronizing signals are applied to an input terminal 35 from the output of the circuit 22 of FIG. 1. These signals are supplied to the conventional integrator type vertical synchronization circuit 25 which includes a resistor 37 and a capacitor 38 utilized to produce the integrated vertical synchronization pulse. The output of this integrator circuit 37, 38 is coupled through a coupling resistor 39 to the collector of an NPN transistor 41, comprising the active element of the vertical blocking oscillator 28. The oscillator 28 includes a variable resistor 44 which may be adjusted to set the operating frequency of the oscillator 28; and a timing capacitor 46 is connected in circuit across the collector emitter path of the oscillator 41. The blocking oscillator 28 is a conventional oscillator and the one shown is typical of oscillators used in television receivers.

In general, the slope of the integrated pulse produced by the circuit 37, 38 is selected to be shallow enough to provide immunity against false starts by horizontal pulses, noise "spikes", etc. Although the stability provided by such a shallow slope is desirable, it also is apparent from an examination of waveform A of FIG. 3 that a shallow slope of this type can result in considerable timing errors (tE) as a result of residual firing level voltage ripples. Such ripples result from insufficient power supply isolation, or insufficient filtering and other causes. The range of these ripples is indicated by the voltage error (VE) in waveform A of FIG. 3. In a conventional television receiver, using an integrator type vertical synchronization circuit, the timing errors produced are responsible for "pairing" of horizontal lines of sequential picture fields instead of the desired 50%-50% interlace.

In order to eliminate the undesired lack of interlace produced by a conventional integrator type vertical synchronization circuit, the vertical oscillator 28 should be fired by virtually rectangular pulses with a much steeper leading slope than the leading slope of the pulses shown in waveform A of FIG. 3. Derivation of such a desired rectanglular synchronization pulse, as illustrated in waveform B of FIG. 3, is accomplished by means of a cascaded digital chain constituting the digital vertical synchronization circuit 27. This chain is shown in FIG. 2 as a first comparator 50 supplying output pulses to a pulse width detector 51, which in turn is cascaded to a second comparator 53, the output of which optionally is supplied through a buffer amplifier 54 and an isolating resistor 57 to the firing point of the transistor 41 in the oscillator 28.

The synchronizing signal components on the input terminal 35 which are supplied to the vertical synchronization circuit 25 also are applied to the upper one of two inputs to the comparator circuit 50. A reference input for the comparator 50 is obtained from a voltage divider 53, 54 connected accross the power supply. The values of the resistors 53 and 54 in the reference voltage divider are selected to cause the output of the comparator 50 to represent only the synchronizing signal components and exclude all of the picture information components from the composite signal.

The output of the comparator circuit 50 is an inverted and amplitude limited representation of the synchronizing signal components supplied to its input. These pulses are supplied to the input of the pulse width detector 51 which is adjusted to reject all pulses except for the vertical synchronizing pulses. These pulses as explained above, are of considerably greater width than the horizontal synchronizing pulses and the equalizing pulses. All pulses which constitute nearly at least half a horizontal line in duration (for example greater than 20 microseconds) are passed on to the inputs of the comparator circuit 53. It is important to note that the pulse width detector circuit 51 does not reject pulses that are longer than its minimum detection width (20 microseconds); so that it is suitable to pass non standard vertical synchronization pulses. Such non-standard vertical synchronization is produced from consumer type VTR players, video games, or local cable or television broadcast signals which sometimes do not adhere to established standards of synchronization.

Since the leading slope of the synchronizing pulse produced by the vertical synchronization circuit 21 and appearing on the output of the buffer amplifier 54 precedes the interception of the integrated pulse (as is apparent from a comparison of waveforms A and B in FIG. 3) with the firing voltage level, the vertical oscillator 28 is fired or synchronized by the digital synchronization circuit 27 under normal conditions of operation of the system. Under extreme noise conditions, such as motor noise or ignition noise there may be partial or total cancellation of the synchronization signals from the circuit 27. In this case, synchronization is taken over by the conventional circuit 25, including the integrator circuit 37, 38, to insure that the operation of the vertical synchronization of the receiver is at least as good as a conventional receiver employing only a conventional integrator-type synchronizing circuit.

The results described above are obtained as a result of the inherent operation of the oscillator circuit 28. The voltage on the collector or the transistor 41 is shown in waveform C of FIG. 3, from which it is obvious that the leading edge of the waveform B normally initiates the firing of the oscillator 28. After firing, the blocking oscillator 28 remains immune to further pulses applied to the collector 41 during its discharge cycle.

Figure 4:
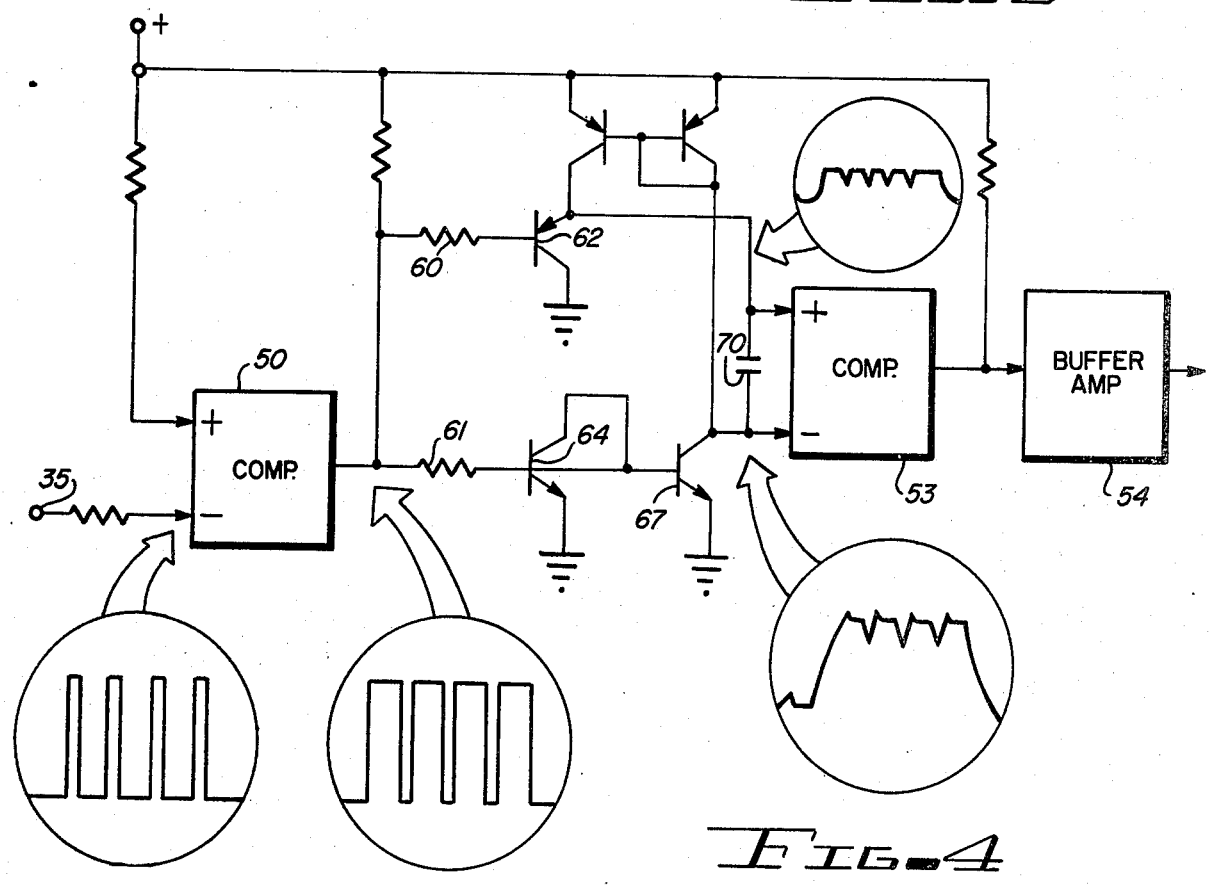
FIG. 4 is a detailed circuit diagram of a portion of the circuit shown in FIG. 2.

FIG. 4 illustrates additional details of the digital vertical synchronizing circuit 27. The comparator 50 is used to equalize and limit the amplitude of the synchronizing pulses which are applied to its lower input as shown in FIG. 4. The pulses are inverted, as shown by the waveform at the output of the comparator circuit 50, and are distributed through a pair of resistors 60 and 61, respectively, to the base of a PNP transistor 62 and to a transistor diode 64. A small replica of the signal goes to the non inverting input (+) of the comparator 53 by way of the transistor 62 and a large excursion of the signal is applied through an NPN amplifier transistor 67 to the inverting input (−) of the comparator 53.

The non inverting input of the comparator 53 is biassed "high" while the inverting input is "low"; so that without a signal; the output of the comparator 53 is a "high" signal level. The horizontal synchronization pulses and narrow noise excursions do not reverse this condition because the timing capacitor 70 prevents a rapid change of the differential between the inverting and non inverting inputs of the comparator 53. If, however, a pulse of sufficient duration arrives when the capacitor 70 is discharged sufficiently to equal or even reverse the potential between the inverting and non inverting inputs of the comparator 53, the output of the comparator 53 goes low (with a sharp signal transition) and stays low until the capacitor 70 is permitted to charge up again sufficiently. At such time, the output of the comparator 53 returns to the quiescent "high" condition. This waveform is shown as waveform B of FIG. 3. By virtue of the narrow input window of the comparator 53, switching in either direction takes place within a very short time, producing a steep slope on the output signal waveform of the buffer amplifier 54. As a consequence, this system permits very accurate firing of the vertical oscillator 28.

Under extreme noise conditions where noise bursts of long duration prevail, it is possible that the timing capacitor 70 becomes charged when such bursts concur with the legitimate synchronization. This tends to disable the synchronizing circuit 27, but the conventional integrator synchronizing circuit 25 then takes over the task of holding the vertical oscillator in synchronization with the incoming signals. Some loss of interlace may occur during these times of prolonged noise bursts, but the operation of the receiver is at least as good as a conventional television receiver. As a consequence, under most conditions of operation, the improved interlace produced by the vertical synchronization circuit 27 results in a superior picture on the picture tube 21 when compared with conventional television receivers. Under worst case conditions, the picture which is reproduced is at least as good as conventional pictures obtained with receivers where only an integrator type vertical synchronization circuit is employed.

Under "gaussian" noise conditions, when desired signals are very weak, the opposite circuit operation occurs. Under these conditions, the integrator type synchronization circuit 25 does not build up to a sufficient amplitude; but the high gain comparators 50 and 53 are still capable of delivering full amplitude. Thus, synchronization is only taken care of by the digital vertical synchronization circuit 27 during weak signal conditions. The wideband nature of gaussian noise does not have a component of vertical frequency strong enough to affect the stability of the circuit 27.

In view of the foregoing, the parallel application of two different types of vertical synchronization circuits, one adjusted for optimum noise immunity and the other adjusted for optimum interlace, results in a superior performance of the television receiver into which the circuits are incorporated. The description of the preferred embodiment of the invention which has been made above and in conjunction with the drawings is to be considered illustrative only and is not to be considered as limiting of the features of the invention. Various changes and modifications will occur to those skilled in the art without departing from the true scope of the invention.

We claim:

1. An improvement in the vertical synchronization circuitry of a television receiver including in combination;

means for receiving a composite television signal including synchronization signal components and for supplying at least vertical synchronization signal components on an output thereof;

vertical oscillator means having a synchronizing signal input and producing vertical drive signals on an output thereof for use by the television receiver;

first vertical synchronizing circuit means coupled between the output of said receiving means and the synchronizing signal input of said oscillator means for supplying vertical synchronizing pulses to said oscillator means, said first vertical synchronizing circuit means adjusted for a predetermined maximum noise immunity and producing synchronizing pulses a first predetermined time after receipt of the vertical synchronizing signal components by said receiving means; and second vertical synchronizing circuit means coupled between the output of said receiving means and the synchronizing signal input of said oscillator means for supplying vertical synchronizing pulses to said oscillator means, said second vertical synchronizing circuit means being adjusted for a predetermined desired vertical interlace and producing vertical synchronizing pulses a second predetermined time aftr receipt of vertical synchronizing signal components by said receiving means, said second predetermined time being prior to said first predetermined time, said oscillator means being nonresponsive to synchronizing pulses supplied to it from said first vertical synchronizing circuit means whenever such pulses are preceded by synchronizing pulses from said second vertical synchronizing circuit means.

2. The combination according to claim 1 wherein said oscillator means is a blocking oscillator means triggered into a cycle of operation by the application of a vertical synchronizing pulse on the synchronizing signal input thereof.

3. The combination according to claim 1 wherein said second vertical synchronizing circuit means has poorer noise immunity than said first vertical synchronizing circuit means and is disabled in response to noise in the signals received by said receiving means in excess of the noise immunity of said second vertical synchronizing circuit means to cause said vertical oscillator means to be operated in response to synchronizing signal pulses produced by said first vertical synchronizing circuit means.

4. The combination according to claim 1 wherein said first vertical synchronizing circuit means includes integrator circuit means for producing the synchronizing pulses therefrom and said second vertical synchronizing circuit means comprises digital circuit means producing substantially rectangular firing pulse the synchronizing signal input of said vertical oscillator means for achieving optimum interlace of the fields of the picture represented by picture signal components of the signals received by said receiving means.

5. The combination according to claim 4 wherein said second vertical synchronizing circuit means comprises a cascaded circuit chain including a first comparator, a pulse width detector, and a second comparator connected between the output of said receiving means and the synchronizing signal input of said vertical oscillator means; and said pulse width detector transfers only pulses which constitute at least a major portion of half a horizontal line in duration to said second comparator.

6. The combination according to claim 5 wherein said first vertical synchronizing circuit means comprises integrating circuit means producing an output pulse having a relatively shallow rise time compared with the output pulses produced by said second vertical synchronizing circuit means.

* * * * *